US012802704B2

(12) United States Patent
Wang et al.

(10) Patent No.: US 12,802,704 B2
(45) Date of Patent: Nov. 17, 2026

(54) METHOD OF GENERATING AUDIO DATA WITH ELECTROACOUSTIC EFFECT, DEVICE, AND STORAGE MEDIUM

(71) Applicant: BEIJING BAIDU NETCOM SCIENCE TECHNOLOGY CO., LTD., Beijing (CN)

(72) Inventors: Yipeng Wang, Beijing (CN); Yunfeng Liu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 940 days.

(21) Appl. No.: 17/915,624

(22) PCT Filed: Mar. 22, 2022

(86) PCT No.: PCT/CN2022/082305
§ 371 (c)(1),
(2) Date: Mar. 2, 2023

(87) PCT Pub. No.: WO2023/024501
PCT Pub. Date: Mar. 2, 2023

(65) Prior Publication Data
US 2024/0212703 A1 Jun. 27, 2024

(30) Foreign Application Priority Data
Aug. 24, 2021 (CN) ......................... 202110978065.3

(51) Int. Cl.
*G10L 21/0272* (2013.01)
*G10L 13/02* (2013.01)
(Continued)

(52) U.S. Cl.
CPC .......... *G10L 21/0272* (2013.01); *G10L 13/02* (2013.01); *G10L 19/032* (2013.01); *G10L 21/0232* (2013.01); *G10L 25/30* (2013.01)

(58) Field of Classification Search
CPC ... G10L 21/0272; G10L 13/02; G10L 19/032; G10L 21/0232; G10L 25/30
See application file for complete search history.

(56) References Cited

U.S. PATENT DOCUMENTS

| | | | | |
|---|---|---|---|---|
| 6,627,806 B1 * | 9/2003 | Carpenter | G10G 7/02 84/454 |
| 8,244,546 B2 * | 8/2012 | Nakano | G10L 13/10 84/645 |

(Continued)

FOREIGN PATENT DOCUMENTS

| | | |
|---|---|---|
| CN | 103440862 | 12/2013 |
| CN | 108417228 | 8/2018 |

(Continued)

OTHER PUBLICATIONS

Nguyen, Binh Phu. "Studies on spectral modification in voice transformation." (2009) entire file available at https://dspace.jaist.ac.jp/dspace/bitstream/10119/8002/7/paper.pdf (Year: 2009).*
Josh S. Allen, "Equal temperaments as mathematical series" available at https://www.bikexprt.com/tunings/tunings0.htm Contents © 1997 John S. Allen, Last revised May 6, 2003 (Year: 2003).*
Bachu, Rajesh G., et al. "Voiced/unvoiced decision for speech signals based on zero-crossing rate and energy." Advanced techniques in computing sciences and software engineering. Dordrecht: Springer Netherlands, 2009. 279-282 (Year: 2009).*

(Continued)

*Primary Examiner* — Bhavesh M Mehta
*Assistant Examiner* — Nandini Subramani
(74) *Attorney, Agent, or Firm* — Pillsbury Winthrop Shaw Pittman, LLP

(57) ABSTRACT

A method of processing audio data, which relates to a field of speech synthesis technology. The method includes: decomposing original audio data to obtain voice audio data and background audio data; performing electroacoustic processing on the voice audio data to obtain electroacoustic voice data; and combining the electroacoustic voice data and
(Continued)

the background audio data to obtain target audio data. An electronic device and a storage medium are further provided.

15 Claims, 4 Drawing Sheets

(51) Int. Cl.

| | |
|---|---|
| ***G10L 19/032*** | (2013.01) |
| ***G10L 21/0232*** | (2013.01) |
| ***G10L 25/30*** | (2013.01) |

(56) References Cited

U.S. PATENT DOCUMENTS

| | | | | |
|---|---|---|---|---|
| 9,368,103 | B2 * | 6/2016 | Nakano | G10L 25/78 |
| 10,854,182 | B1 * | 12/2020 | Huang | G10H 1/366 |
| 2007/0027682 | A1 | 2/2007 | Bennett | |
| 2020/0193946 | A1 * | 6/2020 | Luzzatto | G10H 7/02 |
| 2023/0057082 | A1 * | 2/2023 | Fabbro | G10L 17/02 |

FOREIGN PATENT DOCUMENTS

| | | |
|---|---|---|
| CN | 108922506 | 11/2018 |
| CN | 109166593 | 1/2019 |
| CN | 109346109 | 2/2019 |
| CN | 110706679 | 1/2020 |
| CN | 111243619 | 6/2020 |
| CN | 111370019 | 7/2020 |
| CN | 111724757 | 9/2020 |
| CN | 111899706 | 11/2020 |
| CN | 112086085 | 12/2020 |
| CN | 212660311 | 3/2021 |
| CN | 113178183 | 7/2021 |
| CN | 113689837 | 11/2021 |
| JP | 2004212473 | 7/2004 |
| JP | 2012098318 | 5/2012 |
| JP | 2013117556 | 6/2013 |
| JP | 2021/516786 | 7/2021 |
| WO | 2019/116889 | 6/2019 |
| WO | 2020145353 | 7/2020 |

OTHER PUBLICATIONS

Communication issued in corresponding European Patent Application No. 22773390.4, dated Aug. 20, 2024.

V. Verfaillle et al., "Adaptive digital audio effects", DAFX: Digital Audio Effects, Second Edition, Wiley, pp. 321-391 (2011).

M. Terry et al., "Automated Query Identification in English Dialogue", 3rd International Conference on Spoken Language Processing (ICSLP 94), pp. 891-894 (1994).

C. Cheng, "Design of a pitch quantization and pitch correction system for real-time music effects signal processing", Proceedings of the 2012 Asia Pacific Signal and Information Processing Association Annual Summit and Conference, Hollywood, CA, USA, pp. 1-6 (2012).

A. Loscos, "Spectral Processing of the Singing Voice", A Dissertation submitted to the Department of Information and Communication Technologies of the Pompeu Fabra University, pp. 1-165 (2007).

K. M. Yu, "The role of time in phonetic spaces: Temporal resolution in Cantonese tone perception", Journal of Phonetics, vol. 65, pp. 126-144 (2017).

Communication issued in corresponding European Patent Application No. 22773390.4, dated Apr. 23, 2024.

Y. Ikemiya et al., "Singing Voice Analysis and Editing Based On Mutually Dependent F0 Estimation and Source Separation", 2015 IEEE International Conference on Acoustics, pp. 574-578 (2015).

A. Cohen-Hadria et al., "Voice Anonymization in Urban Sound Recordings", 2019 IEEE 29th International Workshop on Machine Learning for Signal Processing, pp. 1-6 (2019).

Y. Luo et al., "Deep Clustering and Conventional Networks for Music Separation: Stronger Together", arXiv:1611.06265 at arxiv.org (accessed on Jul. 11, 2024), pp. 1-5 (2016).

Office Action issued in corresponding Japanese Patent Application No. 2022-560146, dated Oct. 31, 2023.

International Search Report and Written Opinion issued in corresponding PCT Patent Application No. PCT/CN2022/082305, dated May 31, 2022.

Office Action issued in corresponding Chinese Patent Application No. 202110978065.3, dated May 10, 2023.

* cited by examiner

METHOD OF GENERATING AUDIO DATA WITH ELECTROACOUSTIC EFFECT, DEVICE, AND STORAGE MEDIUM

This application is the U.S. national phase entry of PCT Patent Application No. PCT/CN2022/082305, filed on Mar. 22, 2022, which claims priority to Chinese Patent Application No. 202110978065.3, filed on Aug. 24, 2021, the entire contents of which are incorporated herein in their entireties by reference.

TECHNICAL FIELD

The present disclosure relates to a field of audio processing technology, and in particular, to a field of speech synthesis technology.

BACKGROUND

An electroacoustic effect may be used as a sound filter to adjust and beautify a sound, and have a wide range of applications in scenes such as a K song work or a small video work. A high-quality electroacoustic effect can improve a sound quality of a work. If an application product can provide the high-quality electroacoustic effect, it may enhance the competitiveness of the product, enrich the gameplay of the product, and increase the interest of users.

SUMMARY

The present disclosure provides a method of processing audio data, a device, and a storage medium.

According to an aspect of the present disclosure, a method of processing audio data is provided, including: decomposing original audio data to obtain voice audio data and background audio data; performing electroacoustic processing on the voice audio data to obtain electroacoustic voice data; and combining the electroacoustic voice data and the background audio data to obtain target audio data.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method in embodiments of the present disclosure.

According to another aspect of the present disclosure, a non-transitory computer-readable storage medium having computer instructions therein is provided, wherein the computer instructions are configured to cause a computer to implement the method in embodiments of the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the present disclosure better and do not constitute a limitation to the present disclosure, wherein.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

A method of processing audio data according to an embodiment of the present disclosure will be described below with reference to FIG. 1. It should be noted that, in the technical solutions of the present disclosure, the collection, storage, use, processing, transmission, provision and disclosure of audio data and other data involved comply with relevant laws and regulations, and do not violate public order and good customs.

Figure 1:
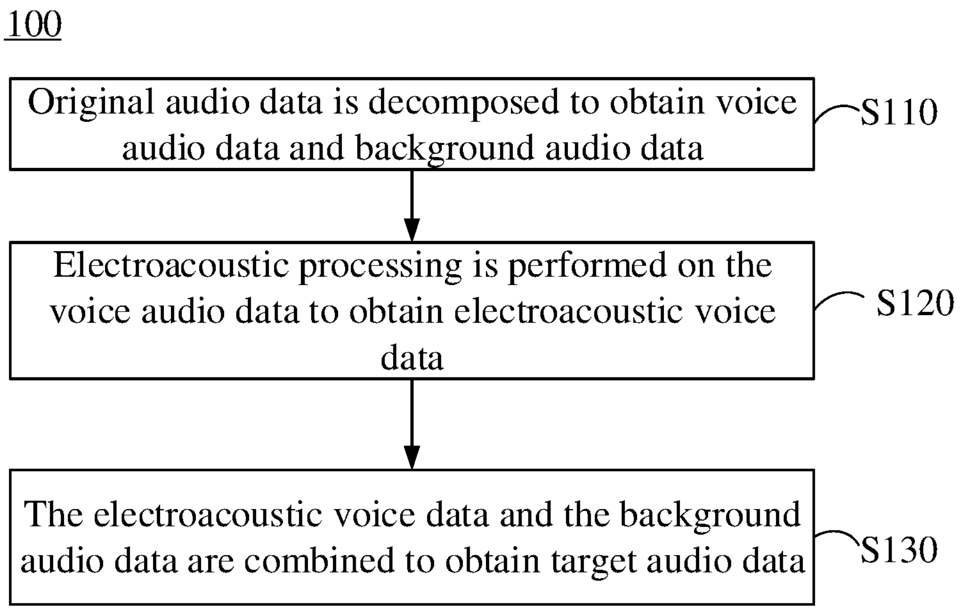
FIG. 1 schematically shows a flowchart of a method of processing audio data according to an embodiment of the present disclosure.

FIG. 1 schematically shows a flowchart of a method of processing audio data according to an embodiment of the present disclosure.

As shown in FIG. 1, a method 100 of processing audio data includes operations S110 to S130.

In operation S110, original audio data is decomposed to obtain voice audio data and background audio data.

In operation S120, electroacoustic processing is performed on the voice audio data to obtain electroacoustic voice data.

In operation S130, the electroacoustic voice data and the background audio data are combined to obtain target audio data.

According to an embodiment of the present disclosure, the original audio data may include, for example, voice information and background sound information, where the voice may be, for example, singing, and the background sound may be, for example, accompaniment music. In this embodiment, the voice information in the original audio data and the background information in the original audio data may be separated by using, for example, a sound source separation algorithm, so as to obtain voice audio data including the voice information and background audio data including the background sound information.

According to an embodiment of the present disclosure, by separating the voice information and the background sound information in the original audio data, performing electroacoustic processing on the voice information, and combining the electroacoustic voice information and the background sound information, it is possible to achieve the electro-acousticization of audio data having both background sound information and the voice information.

According to an embodiment of the present disclosure, a neural network may be used to implement the sound source separation algorithm to decompose the original audio data. An input of the neural network may be the audio data having the background sound information and the voice information. An output of the neural network may include the voice audio data containing the voice information and the background audio data containing the background sound information.

According to an embodiment of the present disclosure, a music file and a voice file may be acquired in advance. The music file and the voice file may be cut into segments of equal length to obtain a plurality of music segments X and a plurality of voice segments Y. Each music segment X and corresponding one voice segment Y may be combined to obtain original audio data Z. The neural network is trained with each original audio data Z as the input of the neural network, and the music segment X and the voice segment Y corresponding to the original audio data Z as a desired output. In addition, in order to improve the training effect and speed up the network convergence, the music segment X, the voice segment Y and the original audio data Z may be pre-processed into Mel-spectrogram. The output of the neural network is also based on the Mel-spectrogram. For example, an output result in a form of Mel-spectrogram may synthesize corresponding original audio data by using an algorithm such as a Griffin-Lim algorithm.

Based on this, a method of decomposing original audio data shown above will be further described below with reference to FIG. 2 in conjunction with specific embodiments. Those skilled in the art may understand that the following exemplary embodiments are only for understanding the present disclosure, and the present disclosure is not limited thereto.

Figure 2:
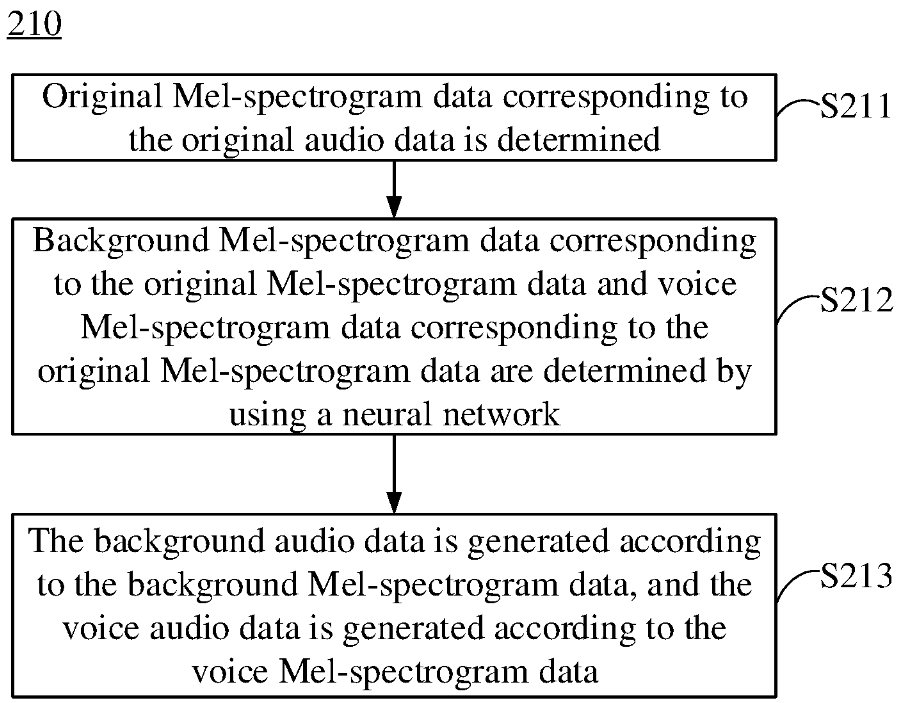
FIG. 2 schematically shows a flowchart of a method of decomposing original audio data according to an embodiment of the present disclosure.

FIG. 2 schematically shows a flowchart of a method of decomposing original audio data according to an embodiment of the present disclosure.

As shown in FIG. 2, a method 210 of decomposing original audio data includes operations S211 to S213.

In operation S211, original Mel-spectrogram data corresponding to the original audio data is determined.

In operation S212, background Mel-spectrogram data corresponding to the original Mel-spectrogram data and voice Mel-spectrogram data corresponding to the original Mel-spectrogram data are determined by using a neural network.

According to an embodiment of the present disclosure, the background Mel-spectrogram data may include background sound information in the original Mel-spectrogram data. The voice Mel-spectrogram data may include voice information in the original Mel-spectrogram data.

In operation S213, the background audio data is generated according to the background Mel-spectrogram data, and the voice audio data is generated according to the voice Mel-spectrogram data.

According to an embodiment of the present disclosure, the background audio data may be generated according to the background Mel-spectrogram data by using the algorithm such as the Griffin-Lim algorithm. The voice audio data may be generated according to the voice Mel-spectrogram data by using the algorithm such as the Griffin-Lim algorithm.

According to an embodiment of the present disclosure, the electroacoustic processing on the voice audio data may be achieved by performing quantization processing on a fundamental frequency of voice data. For example, the fundamental frequency, a spectral envelope and an aperiodic parameter of the voice data may be determined. The fundamental frequency represents a vibration frequency of a vocal cord during pronunciation, which is reflected in the audio frequency as a pitch. Next, the fundamental frequency may be quantized. The voice data may be re-synthesized according to the quantized fundamental frequency, the spectral envelope and the aperiodic parameter, so as to achieve performing the electroacoustic processing on the voice audio data. The re-synthesized voice data is electroacoustic voice data containing voice information with an electroacoustic effect.

A method of performing the electroacoustic processing on the voice audio data shown above will be further described below with reference to FIG. 3 in conjunction with specific embodiments. Those skilled in the art may understand that the following exemplary embodiments are only for understanding the present disclosure, and the present disclosure is not limited thereto.

Figure 3:
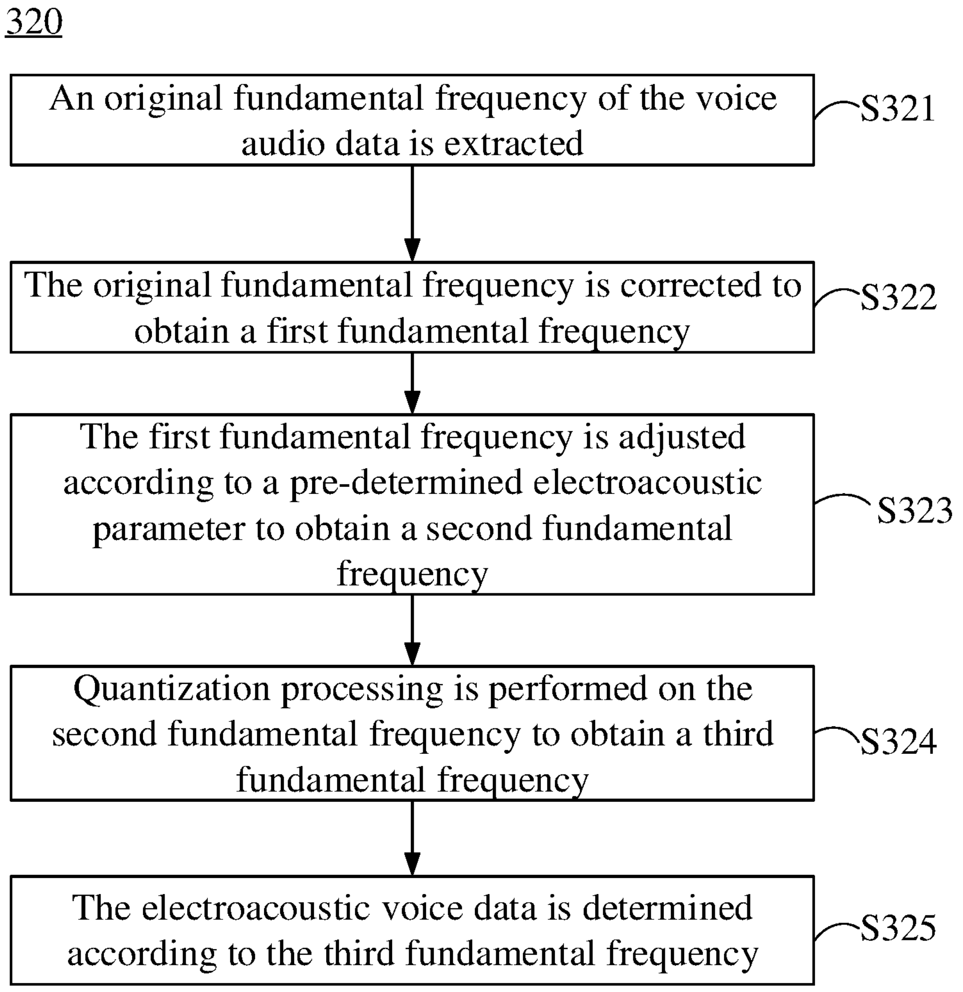
FIG. 3 schematically shows a flowchart of a method of performing electroacoustic processing on voice audio data according to an embodiment of the present disclosure.

FIG. 3 schematically shows a flowchart of a method of performing electroacoustic processing on voice audio data according to an embodiment of the present disclosure.

As shown in FIG. 3, a method 320 of performing electroacoustic processing on voice audio data includes operations S321 to S325.

In operation S321, an original fundamental frequency of the voice audio data is extracted.

According to an embodiment of the present disclosure, for example, the original fundamental frequency may be extracted from the voice audio data according to an algorithm such as DIO, Harvest, etc.

In operation S322, the original fundamental frequency is corrected to obtain a first fundamental frequency.

According to an embodiment of the present disclosure, the electroacoustic effect may be improved by correcting the fundamental frequency. For example, in this embodiment, the voice audio data may be divided into a plurality of audio segments. Then, for each audio segment of the plurality of audio segments, an energy of the audio segment and a zero-crossing rate of the audio segment are determined. According to the energy of the audio segment and the zero-crossing rate of the audio segment, whether the audio segment is a voiced audio segment or not is determined. Then, a fundamental frequency of the voiced audio segment is corrected by using a linear interpolation algorithm.

According to an embodiment of the present disclosure, the voice audio data may be divided into the plurality of audio segments based on a preset unit length. A length of each audio segment is one preset unit length. The preset unit length may be set as desired in practice. For example, in this embodiment, the preset unit length may be any value in a range from 10 ms to 40 ms.

According to an embodiment of the present disclosure, the audio segment includes a plurality of sampling points. The energy of the audio segment may be determined according to a value of each sampling point in the audio segment. For example, the energy of the audio segment may be calculated according to the following equation:

$$E = \sqrt{\frac{\sum_{i=1}^{n} x_i^2}{n}},$$

wherein $x_i$ represents a value of the $i^{th}$ sampling point, and n is the number of sampling points.

According to an embodiment of the present disclosure, the number n of sampling points may be determined according to the length of the audio segment and a sampling rate for the audio segment. Taking a preset unit length of 10 ms as an example, the number n of sampling points may be calculated according to:

n=10/1000*sr=0.01sr, wherein sr represents the sampling rate for the audio.

According to an embodiment of the present disclosure, for every set of two adjacent sampling points in the audio segment, it is determined whether one of the two adjacent sampling points has a positive value and the other one of the two adjacent sampling points has a negative value. Then, a ratio of a number of sets of two adjacent sampling points having a positive value and a negative value respectively to a total number of the sampling points in the audio segment is determined as the zero-crossing rate.

According to an embodiment of the present disclosure, the zero-crossing rate of the audio segment may be calculated according to the following equation:

$$ZCR = \frac{\sum_{i=1}^{n-1} (x_i * x_{i-1} < 0)}{n},$$

wherein ZCR is the zero-crossing rate of the audio segment, n is the number of sampling points in the audio segment, $x_i$ represents the value of the $i^{th}$ sampling point in the audio segment, and $x_{i-1}$ represents a value of the $(i-1)^{th}$ sampling point in the audio segment.

According to an embodiment of the present disclosure, the number n of sampling points may be determined according to the length of the audio segment and the sampling rate for the audio segment. Taking the preset unit length of 10 ms as an example, the number n of sampling points may be calculated according to:

n=10/1000*sr=0.01sr, wherein sr represents the sampling rate for the audio.

When a body is pronouncing, as the vocal cord does not vibrate for unvoiced vocalizations, a corresponding fundamental frequency is zero, and as the vocal cord vibrates for voiced vocalizations, a corresponding fundamental frequency is not zero. Based on this, in this embodiment, the fundamental frequency may be corrected by using the above characteristics.

For example, for each audio segment, if an energy E of the audio segment is less than a threshold e_min and a zero-crossing rate ZCR of the audio segment is greater than a threshold zcr_max, then the audio segment is an unvoiced audio segment having a fundamental frequency of zero. Otherwise, the audio segment is a voiced audio segment having a fundamental frequency of non-zero, where e_min and zcr_max may be set as desired in practice.

For each unvoiced audio segment, a fundamental frequency of the unvoiced audio segment may be set to zero. For each voiced audio segment, a fundamental frequency of each voiced audio segment may be extracted according to an algorithm such as DIO, Harvest, etc., and then it is determined whether the fundamental frequency value of each voiced audio segment is zero or not. For a voiced audio segment having the fundamental frequency value of zero, linear interpolation may be performed, based on a linear interpolation algorithm, by using a value of a voiced audio segment near the voiced audio segment, so as to obtain a non-zero fundamental frequency value as the fundamental frequency value of the voiced audio segment.

For example, there are six voiced audio segments, and fundamental frequency values of the six voiced audio segments are 100, 100, 0, 0, 160, and 100, respectively. As the fundamental frequency value of the third voiced audio segment and the fundamental frequency value of the fourth voiced audio segment are zero, linear interpolation may be performed according to a non-zero fundamental frequency value near the fundamental frequency values of the third and fourth voiced audio segments, that is, linear interpolation may be performed according to the second fundamental frequency value of 100 and the fifth fundamental frequency value of 160. In this way, the obtained fundamental frequency value of the third audio segment and fundamental frequency value of the fourth voiced audio segment are 120 and 140, respectively. That is, the corrected six fundamental frequency values are 100, 100, 120, 140, 160, and 100, respectively.

Then, in operation S323, the first fundamental frequency is adjusted according to a pre-determined electroacoustic parameter to obtain a second fundamental frequency.

According to an embodiment of the present disclosure, the pre-determined electroacoustic parameter may include, for example, an electroacoustic degree parameter and/or an electroacoustic tone parameter. The electroacoustic degree parameter may be used to control the electroacoustic degree. The electroacoustic tone parameter may be used to control the tone. For example, in this embodiment, the electroacoustic degree parameter may include, for example, 1, 1.2, and 1.4. The greater the electroacoustic degree parameter is, the better the electroacoustic effect is. The electroacoustic tone parameter may include, for example, −3, −2, −1, +1, +2, and +3, where −1, −2, −3 represent one tone down, two tones down, and three tones down, respectively; +1, +2, and +3 represent one tone up, two tones up, and three tones up, respectively.

In related art, a parameter for the electroacoustic effect cannot be adjusted, and thus the effect is single. According to an embodiment of the present disclosure, based on the electroacoustic characteristics, the electroacoustic degree parameter and the electroacoustic tone parameter are provided to control the electroacoustic effect, so that different user desires may be satisfied.

According to an embodiment of the present disclosure, a fundamental frequency variance and/or a fundamental frequency mean value may be determined according to the fundamental frequency of the voiced audio segment. A corrected fundamental frequency variance is determined according to the electroacoustic tone parameter and the fundamental frequency variance, and/or a corrected fundamental frequency mean value is determined according to the electroacoustic degree parameter and the fundamental frequency mean value. Then, the first fundamental frequency is adjusted according to the corrected fundamental frequency variance and/or the corrected fundamental frequency mean value, to obtain the second fundamental frequency.

For example, in this embodiment, the variance of the fundamental frequencies of all voiced audio segments may be calculated as the fundamental frequency variance. The mean value of the fundamental frequencies of all the voiced audio segments may be calculated as the fundamental frequency mean value.

Then, the corrected fundamental frequency variance may be calculated according to:

new_var=var*a, wherein new_var is the corrected fundamental frequency variance, var is the fundamental frequency variance, and a is the electroacoustic degree parameter.

The corrected fundamental frequency mean value may be calculated according to:

new_mean=mean*$2^{b/12}$, wherein new_mean is the corrected fundamental frequency mean value, mean is the fundamental frequency mean value, and b is the electroacoustic tone parameter.

Then, the second fundamental frequency may be calculated according to:

$$F0' = \frac{F0 - \text{mean}}{\text{var}} * \text{new\_var} + \text{new\_mean},$$

wherein F0' is the second fundamental frequency.

In operation S324, quantization processing is performed on the second fundamental frequency to obtain a third fundamental frequency.

In natural audio, the tone of the sound is cadence and changes gradually, while in the electroacoustic audio, the tone is quantized to a specific scale, so that the tone does not change continuously, which is similar to a tone produced by an electronic musical instrument. Based on this, according to an embodiment of the present disclosure, the fundamental frequency of the voice data may be quantized by taking each key frequency of a piano as a target frequency.

For example, in this embodiment, a frequency range may be determined according to:

$$\text{scale} = 1 + 12 * \log_2\left(\frac{F0'}{27.5}\right),$$

wherein scale is the frequency range, and F0' is the second fundamental frequency.

Then, based on the frequency range, the third fundamental frequency may be determined according to:

$$F0'' = 27.5 * 2^{\left(\frac{scale-1}{12}\right)},$$

wherein F0" is the third fundamental frequency.

In operation S325, the electroacoustic voice data is determined according to the third fundamental frequency.

According to an embodiment of the present disclosure, a spectral envelope and an aperiodic parameter may be determined according to the voice audio data and the first fundamental frequency. Then, the electroacoustic voice data may be determined according to the third fundamental frequency, the spectral envelope and the aperiodic parameter.

The method of processing audio data described above will be further described below with reference to FIG. 4 in conjunction with specific embodiments. Those skilled in the art may understand that the following exemplary embodiments are only for understanding the present disclosure, and the present disclosure is not limited thereto.

Figure 4:
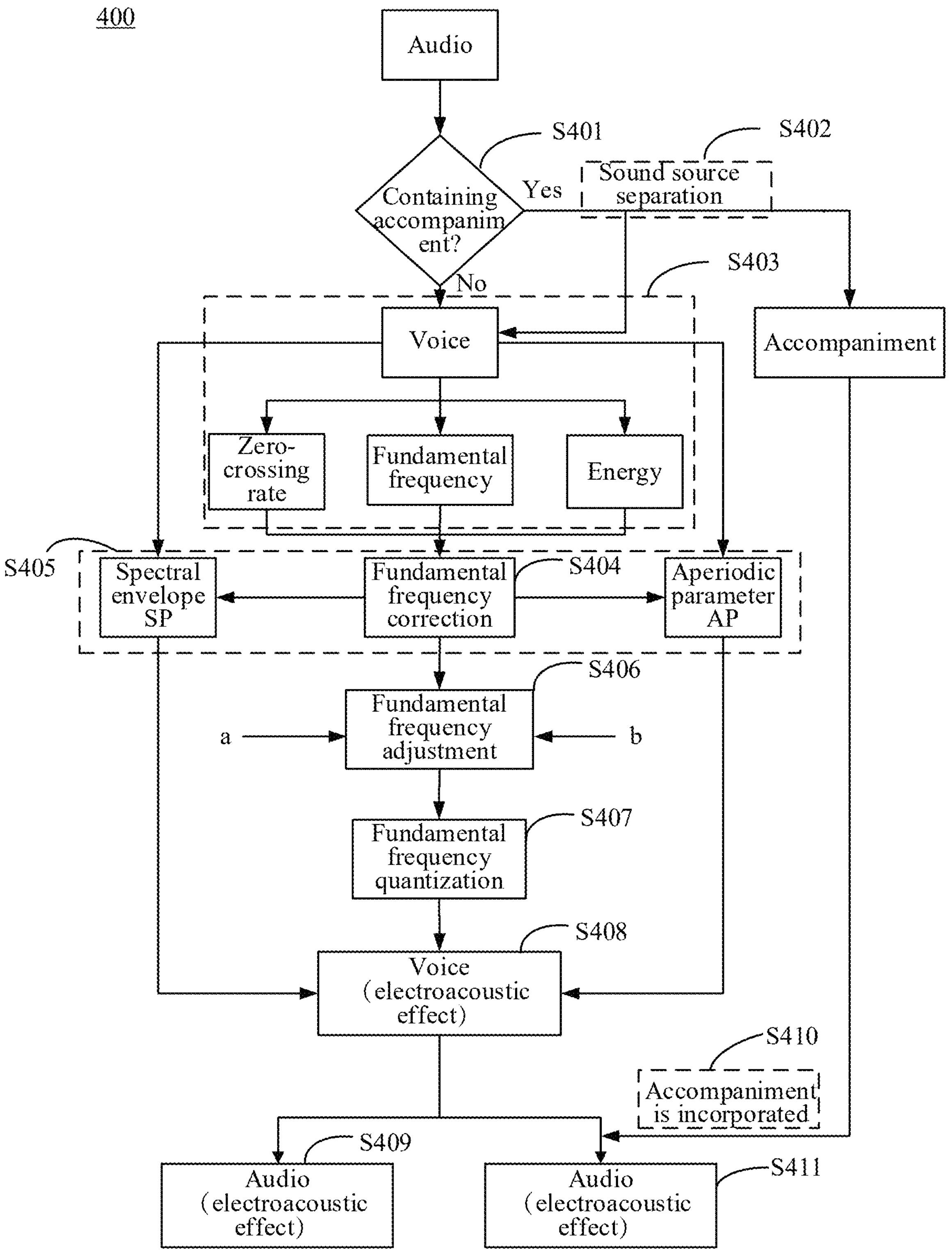
FIG. 4 schematically shows a flowchart of a method of processing audio data according to another embodiment of the present disclosure.

FIG. 4 schematically shows a flowchart of a method of processing audio data according to another embodiment of the present disclosure.

As shown in FIG. 4, a method 400 of processing audio data includes operations S401 to S411.

In operation S401, it is determined whether the audio data (audio for short) contains accompaniment music (accompaniment for short) or not. If the accompaniment is contained, operation S402 is performed. If only voice is contained and no accompaniment is contained, then operation S403 is performed.

In operation S402, the voice is separated from the accompaniment by using the sound source separation algorithm. Then, operation S403 is performed for the separated voice.

In operation S403, a zero-crossing rate, a fundamental frequency f0 and an energy are extracted for the voice.

In operation S404, the fundamental frequency is corrected based on the zero-crossing rate and the energy to obtain F0.

In operation S405, a spectral envelope SP and an aperiodic parameter AP are calculated by using the voice and the corrected fundamental frequency F0.

In operation S406, the fundamental frequency is adjusted to obtain F0' according to an electroacoustic degree parameter a and an electroacoustic tone parameter b set by a user.

In operation S407, the fundamental frequency F0' is quantized to obtain F0".

In operation S408, a voice with electroacoustic effect is synthesized by using the fundamental frequency F0", the spectral envelope SP and the aperiodic parameter AP.

In operation S409, if the audio contains the accompaniment, operation S410 is performed. Otherwise, operation S411 is performed.

In operation S410, the accompaniment is also combined into the voice to generate a final audio with electroacoustic effect.

In operation S411, the audio with the electroacoustic effect is output.

According to the method of processing audio data of the embodiment of the present disclosure, it is possible to flexibly and efficiently add the electroacoustic effect to the audio data, and improve the entertainment interest of users.

Figure 5:
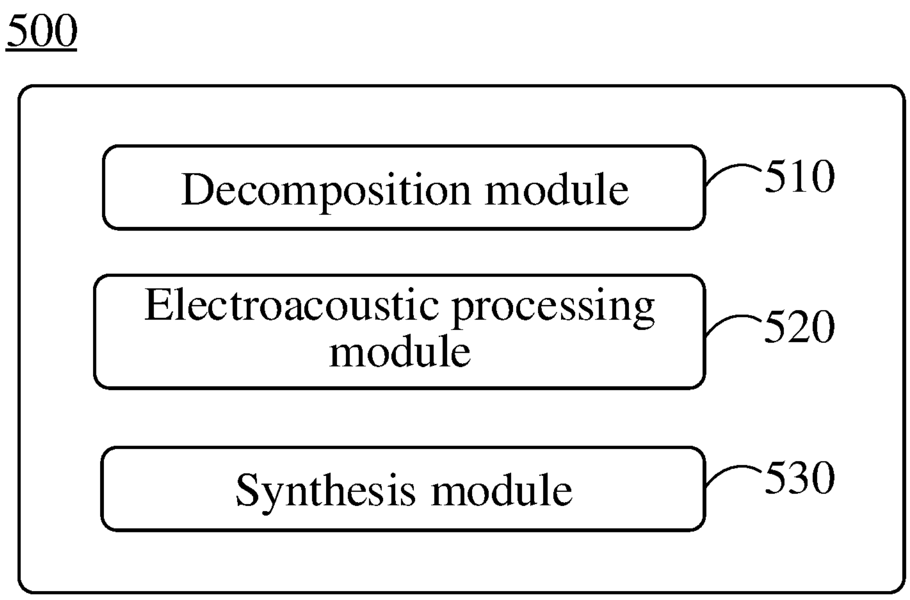
FIG. 5 schematically shows a block diagram of an apparatus of processing audio data according to an embodiment of the present disclosure.

FIG. 5 schematically shows a block diagram of an apparatus of processing audio data according to an embodiment of the present disclosure.

As shown in FIG. 5, an apparatus 500 of processing audio data includes a decomposition module 510, an electroacoustic processing module 520 and a synthesis module 530.

The decomposition module 510 is used to decompose original audio data to obtain voice audio data and background audio data.

The electroacoustic processing module 520 is used to perform electroacoustic processing on the voice audio data to obtain electroacoustic voice data.

The synthesis module 530 is used to combine the electroacoustic voice data and the background audio data to obtain target audio data.

According to an embodiment of the present disclosure, the decomposition module may include a Mel-spectrogram determination sub-module, a decomposition sub-module and a generation sub-module. The Mel-spectrogram determination sub-module is used to determine original Mel-spectrogram data corresponding to the original audio data. The decomposition sub-module is used to determine, by using a neural network, background Mel-spectrogram data corresponding to the original Mel-spectrogram data and voice Mel-spectrogram data corresponding to the original Mel-spectrogram data. The generation sub-module is used to generate the background audio data according to the background Mel-spectrogram data, and generate the voice audio data according to the voice Mel-spectrogram data.

According to an embodiment of the present disclosure, the electroacoustic processing module may include an extraction sub-module, a correction sub-module, an adjustment sub-module, a quantization sub-module and an electroacoustic determination sub-module. The extraction sub-module is used to extract an original fundamental frequency of the voice audio data. The correction sub-module is used to correct the original fundamental frequency to obtain a first fundamental frequency. The adjustment sub-module is used to adjust, according to a pre-determined electroacoustic parameter, the first fundamental frequency to obtain a second fundamental frequency. The quantization sub-module is used to perform quantization processing on the second fundamental frequency to obtain a third fundamental frequency. The electroacoustic determination sub-module is used to determine the electroacoustic voice data according to the third fundamental frequency.

According to an embodiment of the present disclosure, the correction sub-module may include a segmentation unit, an energy determination unit, a zero-crossing rate determination unit, a voiced determination unit and a correction unit. The segmentation unit is used to divide the voice audio data into a plurality of audio segments. The energy determination unit is used to determine, for each audio segment of the plurality of audio segments, an energy of the audio segment. The zero-crossing rate determination unit is used to determine, for each audio segment of the plurality of audio segments, a zero-crossing rate of the audio segment. The voiced determination unit is used to determine, according to the energy of the audio segment and the zero-crossing rate of the audio segment, whether the audio segment is a voiced audio segment or not. The correction unit is used to correct a fundamental frequency of the voiced audio segment by using a linear interpolation algorithm.

According to an embodiment of the present disclosure, the audio segment includes a plurality of sampling points. The energy determination unit is further used to determine the energy of the audio segment according to a value of each sampling point in the audio segment.

According to an embodiment of the present disclosure, the zero-crossing rate determination unit is further used to determine, for every set of two adjacent sampling points in the audio segment, whether a value of one of the two adjacent sampling points has a sign opposite to a sign of a value of the other one of the two adjacent sampling points, and then determine a ratio of a number of sets of two adjacent sampling points having values of opposite signs to a total number of the sampling points in the audio segment as the zero-crossing rate.

According to an embodiment of the present disclosure, the pre-determined electroacoustic parameter may include the electroacoustic degree parameter and/or the electroacoustic tone parameter. The adjustment sub-module may include a first determination unit, a second determination unit and an adjustment unit. The first determination unit is used to determine, according to the fundamental frequency of the voiced audio segment, a fundamental frequency variance and/or a fundamental frequency mean value. The second determination unit is used to determine a corrected fundamental frequency variance according to the electroacoustic degree parameter and the fundamental frequency variance, and/or determine a corrected fundamental frequency mean value according to the electroacoustic tone parameter and the fundamental frequency mean value. The adjustment unit is used to adjust, according to the corrected fundamental frequency variance and/or the corrected fundamental frequency mean value, the first fundamental frequency to obtain the second fundamental frequency.

According to an embodiment of the present disclosure, the quantization sub-module may include a frequency range determination unit and a third fundamental frequency determination unit.

The frequency range determination unit is used to determine a frequency range according to:

$$\text{scale} = 1 + 12 * \log_2\left(\frac{F0'}{27.5}\right),$$

wherein scale is the frequency range, and F0' is the second fundamental frequency.

The third fundamental frequency determination unit is used to determine, based on the frequency range, the third fundamental frequency according to:

$$F0'' = 27.5 * 2^{\left(\frac{scale-1}{12}\right)},$$

wherein F0" is the third fundamental frequency.

According to an embodiment of the present disclosure, the above-mentioned apparatus of processing audio data may further include a determination module, which is used to determine a spectral envelope and an aperiodic parameter according to the voice audio data and the first fundamental frequency.

According to an embodiment of the present disclosure, the electroacoustic determination sub-module is further used to determine the electroacoustic voice data according to the third fundamental frequency, the spectral envelope and the aperiodic parameter.

According to an embodiment of the present disclosure, the present disclosure further provides an electronic device, a readable storage medium, and a computer program product.

Figure 6:
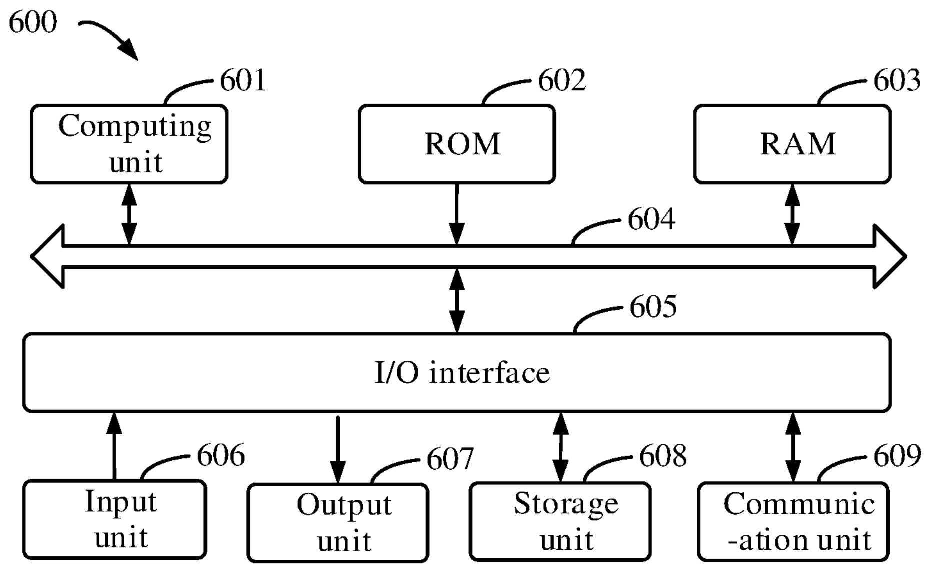
FIG. 6 schematically shows a block diagram of an example electronic device for implementing embodiments of the present disclosure.

FIG. 6 shows a schematic block diagram of an exemplary electronic device 600 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 6, the device 600 may include a computing unit 601, which may perform various appropriate actions and processing based on a computer program stored in a read-only memory (ROM) 602 or a computer program loaded from a storage unit 608 into a random access memory (RAM) 603. Various programs and data required for the operation of the device 600 may be stored in the RAM 603. The computing unit 601, the ROM 602 and the RAM 603 are connected to each other through a bus 604. An input/output (I/O) interface 605 is further connected to the bus 604.

Various components in the device 600, including an input unit 606 such as a keyboard, a mouse, etc., an output unit 607 such as various types of displays, speakers, etc., a storage unit 608 such as a magnetic disk, an optical disk, etc., and a communication unit 609 such as a network card, a modem, a wireless communication transceiver, etc., are connected to the I/O interface 605. The communication unit 609 allows the device 600 to exchange information/data with other devices through a computer network such as the Internet and/or various telecommunication networks.

The computing unit 601 may be various general-purpose and/or special-purpose processing components with processing and computing capabilities. Some examples of the computing unit 601 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 601 may perform the various methods and processes described above, such as the method of processing audio data. For example, in some embodiments, the method of processing audio data may be implemented as a computer software program that is tangibly contained on a machine-readable medium, such as a storage unit 608. In some embodiments, part or all of a computer program may be loaded and/or installed on the device 600 via the ROM 602 and/or the communication unit 609. When the computer program is loaded into the RAM 603 and executed by the computing unit 601, one or more steps of the method of processing audio data described above may be performed. Alternatively, in other embodiments, the computing unit 601 may be configured to perform the method of processing audio data in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of generating audio data with electroacoustic effect, the method comprising:

decomposing, using a neural network, original audio data to obtain voice audio data and background audio data;

performing electroacoustic processing on the voice audio data to obtain electroacoustic voice data; and combining the electroacoustic voice data and the background audio data to obtain target audio data with electroacoustic effect, wherein the performing electroacoustic processing on the voice audio data to obtain electroacoustic voice data comprises:

extracting an original fundamental frequency of the voice audio data;

correcting the original fundamental frequency to obtain a first fundamental frequency;

adjusting, according to a pre-determined electroacoustic parameter, the first fundamental frequency to obtain a second fundamental frequency;

performing quantization processing on the second fundamental frequency to obtain a third fundamental frequency, wherein the quantization processing comprises determining a frequency range based on a piano key frequency and calculating the third fundamental frequency based on the frequency range, so as to quantize the second fundamental frequency by taking each key frequency of a piano as a target frequency; and determining the electroacoustic voice data according to the third fundamental frequency.

2. The method according to claim 1, wherein the decomposing original audio data to obtain voice audio data and background audio data comprises:

determining original Mel-spectrogram data corresponding to the original audio data;

determining, by using the neural network, background Mel-spectrogram data corresponding to the original Mel-spectrogram data and voice Mel-spectrogram data corresponding to the original Mel-spectrogram data; and generating the background audio data according to the background Mel-spectrogram data, and generating the voice audio data according to the voice Mel-spectrogram data.

3. The method according to claim 1, wherein the correcting the original fundamental frequency to obtain a first fundamental frequency comprises:

dividing the voice audio data into a plurality of audio segments;

determining, for each audio segment of the plurality of audio segments, an energy of the audio segment and a zero-crossing rate of the audio segment;

determining, according to the energy of the audio segment and the zero-crossing rate of the audio segment, whether the audio segment is a voiced audio segment or not; and correcting a fundamental frequency of the voiced audio segment by using a linear interpolation algorithm.

4. The method according to claim 3, wherein the audio segment comprises a plurality of sampling points, and the determining an energy of the audio segment comprises determining the energy of the audio segment according to a value of each sampling point in the audio segment.

5. The method according to claim 4, further comprising determining a spectral envelope and an aperiodic parameter according to the voice audio data and the first fundamental frequency, wherein the determining the electroacoustic voice data according to the third fundamental frequency comprises:

determining the electroacoustic voice data according to the third fundamental frequency, the spectral envelope and the aperiodic parameter.

6. The method according to claim 3, wherein the audio segment comprises a plurality of sampling points, and the determining a zero-crossing rate of the audio segment comprises:

determining, for every set of two adjacent sampling points in the audio segment, whether a value of one of the two adjacent sampling points has a sign opposite to a sign of a value of the other one of the two adjacent sampling points; and determining a ratio of a number of sets of two adjacent sampling points having values of opposite signs to a total number of the sampling points in the audio segment as the zero-crossing rate.

7. The method according to claim 6, further comprising determining a spectral envelope and an aperiodic parameter according to the voice audio data and the first fundamental frequency, wherein the determining the electroacoustic voice data according to the third fundamental frequency comprises:

determining the electroacoustic voice data according to the third fundamental frequency, the spectral envelope and the aperiodic parameter.

8. The method according to claim 3, wherein the pre-determined electroacoustic parameter comprises an electroacoustic degree parameter and/or an electroacoustic tone parameter, and the adjusting, according to a pre-determined electroacoustic parameter, the first fundamental frequency to obtain a second fundamental frequency comprises:

determining, according to the fundamental frequency of the voiced audio segment, a fundamental frequency variance and/or a fundamental frequency mean value;

determining a corrected fundamental frequency variance according to the electroacoustic degree parameter and the fundamental frequency variance, and/or determining a corrected fundamental frequency mean value according to the electroacoustic tone parameter and the fundamental frequency mean value; and adjusting, according to the corrected fundamental frequency variance and/or the corrected fundamental frequency mean value, the first fundamental frequency to obtain the second fundamental frequency.

9. The method according to claim 8, further comprising determining a spectral envelope and an aperiodic parameter according to the voice audio data and the first fundamental frequency, wherein the determining the electroacoustic voice data according to the third fundamental frequency comprises:

determining the electroacoustic voice data according to the third fundamental frequency, the spectral envelope and the aperiodic parameter.

10. The method according to claim 3, further comprising determining a spectral envelope and an aperiodic parameter according to the voice audio data and the first fundamental frequency, wherein the determining the electroacoustic voice data according to the third fundamental frequency comprises:

determining the electroacoustic voice data according to the third fundamental frequency, the spectral envelope and the aperiodic parameter.

11. The method according to claim 1, further comprising determining a spectral envelope and an aperiodic parameter according to the voice audio data and the first fundamental frequency, wherein the determining the electroacoustic voice data according to the third fundamental frequency comprises determining the electroacoustic voice data according to the third fundamental frequency, the spectral envelope and the aperiodic parameter.

12. An electronic device, comprising:

at least one processor; and a memory communicatively connected to the at least one processor, wherein the memory stores instructions executable by the at least one processor, and the instructions, when executed by the at least one processor, cause the at least one processor to at least:

decompose, using a neural network, original audio data to obtain voice audio data and background audio data;

perform electroacoustic processing on the voice audio data to obtain electroacoustic voice data, the performance of the electroacoustic processing comprising:

extraction of an original fundamental frequency of the voice audio data;

correction of the original fundamental frequency to obtain a first fundamental frequency;

adjustment, according to a pre-determined electroacoustic parameter, of the first fundamental frequency to obtain a second fundamental frequency;

performance of quantization processing on the second fundamental frequency to obtain a third fundamental frequency, wherein the quantization processing comprises determination of a frequency range based on a piano key frequency and calculation of the third fundamental frequency based on the frequency range, so as to quantize the second fundamental frequency by taking each key frequency of a piano as a target frequency; and determination of the electroacoustic voice data according to the third fundamental frequency; and combine the electroacoustic voice data and the background audio data to obtain target audio data with electroacoustic effect.

13. The electronic device according to claim 12, wherein the instructions are further configured to cause the at least one processor to at least:

determine original Mel-spectrogram data corresponding to the original audio data;

determine, by using the neural network, background Mel-spectrogram data corresponding to the original Mel-spectrogram data and voice Mel-spectrogram data corresponding to the original Mel-spectrogram data; and generate the background audio data according to the background Mel-spectrogram data, and generate the voice audio data according to the voice Mel-spectrogram data.

14. A non-transitory computer-readable storage medium having computer instructions therein, wherein the computer instructions are configured to cause a computer system to at least:

decompose, using a neural network, original audio data to obtain voice audio data and background audio data;

perform electroacoustic processing on the voice audio data to obtain electroacoustic voice data, the performance of the electroacoustic processing comprising:

extraction of an original fundamental frequency of the voice audio data;

correction of the original fundamental frequency to obtain a first fundamental frequency;

adjustment, according to a pre-determined electroacoustic parameter, of the first fundamental frequency to obtain a second fundamental frequency;

performance of quantization processing on the second fundamental frequency to obtain a third fundamental frequency, wherein the quantization processing comprises determination of a frequency range based on a piano key frequency and calculation of the third fundamental frequency based on the frequency range, so as to quantize the second fundamental frequency by taking each key frequency of a piano as a target frequency; and determination of the electroacoustic voice data according to the third fundamental frequency; and combine the electroacoustic voice data and the background audio data to obtain target audio data with electroacoustic effect.

15. The medium according to claim 14, wherein the instructions are further configured to cause the computer system to at least:

determine original Mel-spectrogram data corresponding to the original audio data;

determine, by using the neural network, background Mel-spectrogram data corresponding to the original Mel-spectrogram data and voice Mel-spectrogram data corresponding to the original Mel-spectrogram data; and generate the background audio data according to the background Mel-spectrogram data, and generate the voice audio data according to the voice Mel-spectrogram data.

* * * * *